Jan. 8, 1957 E. L. WALKER 2,777,021

PARALLEL CONNECTED MAGNETIC AMPLIFIER

Filed June 4, 1954

WITNESSES

Robert A. Baird

K. W. Thomas

INVENTOR

Edward L. Walker.

BY

Ezra W. Savage

ATTORNEY

United States Patent Office 2,777,021
Patented Jan. 8, 1957

2,777,021

PARALLEL CONNECTED MAGNETIC AMPLIFIER

Edward L. Walker, Pittsburgh, Pa., assignor to Westinghouse Electric Corporation, East Pittsburgh, Pa., a corporation of Pennsylvania Application June 4, 1954, Serial No. 434,451

6 Claims. (Cl. 179—171)

This invention relates to magnetic amplifiers and, more particularly, to parallel connected magnetic amplifiers which supply a relatively large amount of power to a load.

Certain problems are presented in supplying a relatively large amount of power to a load by means of a magnetic amplifier. For instance, in order to obtain high performance for the magnetic amplifier, it is necessary to use toroidal cores. However, from an economical standpoint, there is a limit as to the size of the toroidal cores that can be utilized. Therefore, if good performance is to be obtained from these prior art magnetic amplifiers, the amount of power output will be limited.

Two or more separate magnetic amplifiers could be utilized to supply a load in order to increase the amount of power output. However, when two separate magnetic amplifiers are used to supply power to the load, they have to have identical characteristics in order to properly share the load. In practice, this is a condition that is difficult to obtain.

An object of this invention is to provide for increasing the power output of a magnetic device without sacrificing its performance.

Another object of this invention is to provide for so interconnecting the load windings of two magnetic amplifiers that by controlling the flux level in the magnetic core means of one of the magnetic amplifiers, a proportional change is made in the flux level in the magnetic core means of the other magnetic amplifier even though only the first magnetic amplifier has a control signal applied directly thereto, to thus obtain a relatively high power output from the two magnetic amplifiers without sacrificing their performance.

A further object of this invention is to so interconnect two magnetic amplifiers that a number of the component parts are common to each of the magnetic amplifiers, thereby providing a relatively high power output with a minimum of parts, size and weight.

Figure 1:
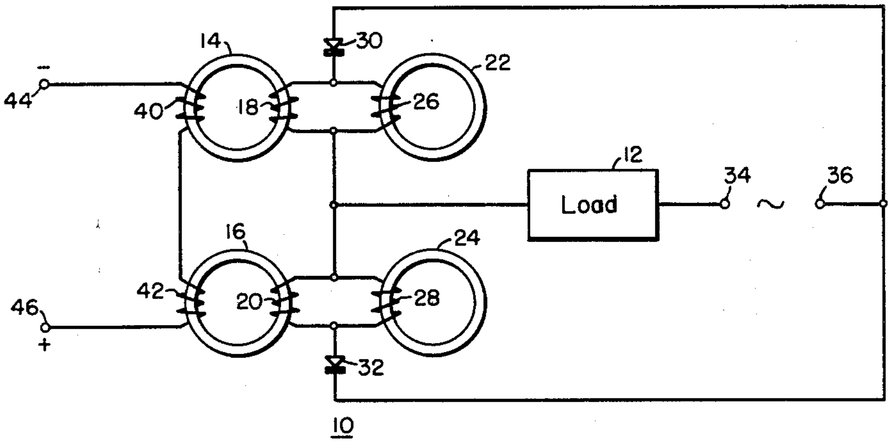
Figure 2:
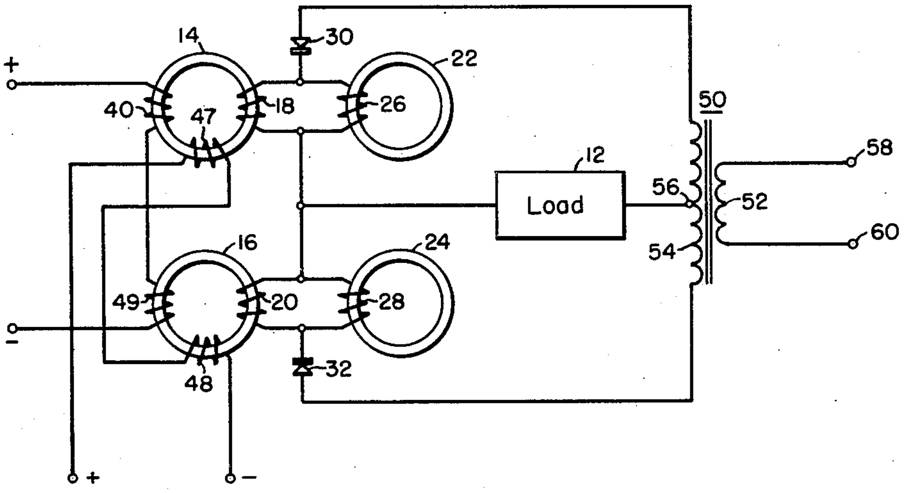

Other objects of this invention will become apparent from the following description when taken in conjunction with the accompanying drawing, in which:

Figure 1 is a schematic diagram of apparatus and circuits illustrating this invention with respect to a doubler type magnetic amplifier; and Fig. 2 is a schematic diagram of circuits and apparatus illustrating this invention with respect to a center-tap magnetic amplifier.

Referring to Fig. 1, there is illustrated a magnetic device 10 for supplying a relatively large amount of power to a load 12. In general, the magnetic device 10 comprises two doubler-type self-saturating magnetic amplifiers which are connected in parallel circuit relationship with one another.

One of the doubler-type self-saturating magnetic amplifiers comprises toroidal-type magnetic core members 14 and 16 which have disposed in inductive relationship therewith load windings 18 and 20, respectively. On the other hand, the other doubler-type magnetic amplifier comprises toroidal-type magnetic core members 22 and 24 which have disposed in inductive relationship therewith load windings 26 and 28, respectively.

In accordance with the teachings of this invention, the load windings 18 and 26 are connected in parallel circuit relationship with one another, and the load windings 20 and 28 are likewise connected in parallel circuit relationship with one another. Thus, the magnetic device 10 comprises two sets of parallel connected load windings, one set comprising the load windings 18 and 26 and the other set comprising the load windings 20 and 28. It is to be noted that in each set of load windings one of the load windings forms a part of one of the doubler-type magnetic amplifiers, and the other load winding forms a part of the other doubler-type magnetic amplifier.

In order to permit current to flow in only one direction through the parallel connected load windings 18 and 26, a self-saturating rectifier 30 is connected in series circuit relationship with the parallel circuit including the load windings 18 and 26. In like manner, in order to permit current to flow in only one direction through the parallel connected load windings 20 and 28, a self-saturating rectifier 32 is connected in series circuit relationship with the parallel circuit including the load windings 20 and 28.

As illustrated, the two series circuits, one of which includes the self-saturating rectifier 30 and the parallel connected load windings 18 and 26, and the other of which includes the self-saturating rectifier 32 and the parallel connected load windings 20 and 28, are so interconnected with the load 12 and with terminals 34 and 36, which have applied thereto an alternating voltage, that current alternately flows through, first, the series circuit including the self-saturating rectifier 30 and the parallel connected load windings 18 and 26, and second, through the series circuit including the self-saturating rectifier 32 and the parallel connected load windings 20 and 28.

In order to effect a resetting of the flux level in the magnetic core member 14 during that time when the load winding 18 is not conducting current, a control winding 40 is disposed in inductive relationship with the magnetic core member 14. In like manner, in order to effect a resetting of the flux level in the magnetic core member 16 when the load winding 20 is not conducting current, a control winding 42 is disposed in inductive relationship with the magnetic core member 16. In this instance, the control windings 40 and 42 are connected in series circuit relationship with one another, the series circuit being connected to terminals 44 and 46 which have applied thereto a variable direct-current control voltage. As illustrated, the control windings 40 and 42 are so disposed that the current flow therethrough produces a flux in the respective magnetic core members 14 and 16 that opposes the flux produced by the current flow through the respective load windings 18 and 20.

The operation of the magnetic device 10 will now be described. Assuming that the terminal 36 is at a positive polarity with respect to the terminal 34, then exciting current flows through the self-saturating rectifier 30, the parallel connected load windings 18 and 26, and the load 12, to the terminal 34, to thereby drive the magnetic core members 14 and 22 to saturation. Once the magnetic core members 14 and 22 substantially completely saturate, load current flows from the terminal 36 through the self-saturating rectifier 30, the parallel connected load windings 18 and 26, and the load 12, to the terminal 34.

During this same half-cycle of the alternating voltage applied to the terminals 34 and 36, when the terminal 36 is at a positive polarity with respect to the terminal 34, the control winding 42 is effecting a resetting of the flux level in the magnetic core member 16. However, in resetting the flux level in the magnetic core member 16, the change in flux in the magnetic core member 16 effects an induced voltage across the load winding 20. This induced voltage produced across the load winding 20 is applied to the load winding 28, to thereby effect a proportional resetting of the flux level in the magnetic core member 24. Therefore, even though the control signal is only applied directly to the magnetic amplifier comprising the magnetic core member 16, still a proportional resetting of the flux level takes place in the magnetic core member 24 of the other magnetic amplifier. It is to be noted that this proportional resetting of the flux level in the magnetic core member 24 takes place even though the characteristics of the magnetic core members 16 and 24 and the characteristics of the load windings 20 and 28 are not identical. However, in order to secure proper operation, it is necessary that the resistance values of the load windings 20 and 28 be substantially equal, otherwise there will be an improper sharing of the load between the two magnetic amplifiers, one of which comprises the magnetic core member 16 and the other of which comprises the magnetic core member 24. Thus, a proper sharing of the load is obtained between the two magnetic amplifiers, provided only the resistance values of the load windings 20 and 28 be substantially equal. In practice, it is relatively easy to obtain equal resistance values for the load windings 20 and 28.

In operation, when the terminal 34 is at a positive polarity with respect to the terminal 36 exciting current flows through the load 12, the parallel connected load windings 20 and 28, and the self-saturating rectifier 32, to the terminal 36. Such a current flow drives the magnetic core members 16 and 24 to saturation. Once the magnetic core members 16 and 24 saturate, load current flows from the terminal 34 through the load 12, the parallel connected load windings 20 and 28, and the self-saturating rectifier 32, to the terminal 36. During this same half-cycle of the alternating voltage applied to the terminals 34 and 36, the current flow through the control winding 40 effects a resetting of the flux level in the magnetic core member 14. This, in turn, effects an induced voltage across the load winding 18, which induced voltage is applied to the load winding 26 to thereby effect a proportional resetting of the flux level in the magnetic core member 22. As hereinbefore mentioned with respect to the load windings 20 and 28, it is only necessary that the load windings 18 and 26 have substantially equal resistance values in order to obtain substantially equal power outputs from the two magnetic amplifiers, one of which includes the magnetic core member 14 and the other of which includes the magnetic core member 22.

Referring to Fig. 2, there is illustrated another embodiment of this invention in which like components of Figs. 1 and 2 have been given the same reference characters. The main distinction between the apparatus illustrated in Figs. 1 and 2 is that in the apparatus of Fig. 2, the invention is illustrated with reference to two parallel connected center-tap self-saturating magnetic amplifiers. Further, one of the magnetic amplifiers is biased a predetermined amount. In particular, biasing windings 47 and 48 are disposed in inductive relationship with the magnetic core members 14 and 16, respectively. These biasing windings 47 and 48 are so disposed that the current flow therethrough produces a flux in the respective magnetic core members 14 and 16 that opposes the flux produced by the current flow through the respective load windings 18 and 20. In addition, a control winding 49 is disposed in inductive relationship with the magnetic core member 16, the control windings 40 and 49 being so disposed on their respective magnetic core members 14 and 16 that current flow therethrough produces a flux in these magnetic core members that aids the flux produced in the respective magnetic core members by the current flow through the load windings 18 and 20.

Energy for the load 12 is supplied by a center-tap transformer 50 having a primary winding 52 and a secondary winding 54 which is provided with a center-tap 56. In this instance, the primary winding 52 is connected to terminals 58 and 60 which have applied thereto an alternating voltage.

In the apparatus of Fig. 2, the two series circuits, one of which includes the self-saturating rectifier 30 and the parallel connected load windings 18 and 26 and the other of which includes the self-saturating rectifier 32 and the parallel connected load windings 20 and 28, are so interconnected with the load 12 and with the secondary winding 54 of the transformer 50 that current flows in one direction through the load 12. Thus, when the upper end of the secondary winding 54, as illustrated, is at a positive polarity with respect to its lower end, exciting current flows through the self-saturating rectifier 30, the parallel connected load windings 18 and 26, and the load 12, to the center-tap 56 of the secondary winding 54, to thereby drive the magnetic core members 14 and 22 to saturation. During this same half-cycle of the alternating voltage applied to the terminals 58 and 60, the control winding 49 and the biasing winding 48 effect a resetting of the flux level in the magnetic core member 16. This resetting of the flux level in the magnetic core member 16 effects an induced voltage across the load winding 20, which induced voltage is applied to the load winding 28 to thereby effect a proportional resetting of the flux level in the magnetic core member 24.

On the other hand, when the polarity of the alternating voltage applied to the terminals 58 and 60 is such that the lower end of the secondary winding 54 of the transformer 50 is at a positive polarity with respect to its upper end, as illustrated, exciting current flows from the lower end of the secondary winding 54 through the self-saturating rectifier 32, the parallel connected load windings 20 and 28, and the load 12, to the center-tap 56 of the secondary winding 54. Such a current flow drives the magnetic core members 16 and 24 to saturation to thereby effect a flow of load current through this same circuit. During this same half-cycle of the alternating voltage applied to the terminals 58 and 60, current flows through the control winding 40 and the biasing winding 47 to thereby effect a resetting of the flux level in the magnetic core member 14. This resetting of the flux level in the magnetic core member 14 effects an induced voltage across the load winding 18, which induced voltage is applied to the load winding 26 to thereby effect a proportional resetting of the flux level in the magnetic core member 22. Since the remaining operation of the apparatus of Fig. 2 is similar to the operation of the apparatus of Fig. 1, a further description of the apparatus of Fig. 2 is deemed unnecessary.

It is to be understood that although the apparatus described hereinbefore has only two magnetic amplifiers connected in parallel circuit relationship with one another, this invention is equally applicable to more than two magnetic amplifiers connected in parallel circuit relationship with one another. Also, this invention is applicable to other known types of magnetic amplifiers.

The apparatus embodying the teachings of this invention has several advantages. For instance, a relatively high power output can be supplied to the load 12 by magnetic amplifiers whose performance is good and whose original cost of manufacture is relatively low. In addition, the magnetic amplifiers of each of the embodiments illustrated herein equally share the load. Further, a minimum of component parts are required since the source of alternating voltage and the self-saturating rectifiers 30 and 32 are common to each of the magnetic amplifiers.

Since certain changes may be made in the above apparatus and different embodiments of the invention could be made without departing from the scope thereof, it is intended that all matter contained in the above description or shown in the accompanying drawing shall be interpreted as illustrative and not in a limiting sense.

I claim as my invention:

1. In an amplifier connected to receive energy from a source of alternating current and supply energy to a load, the combination comprising, a plurality of load windings, the load windings being connected in parallel circuit relationship with one another with respect to the source of alternating current, a magnetc core member disposed in inductive relationship with each of the load windings, a control winding disposed in inductive relationship with one of the magnetic core members, whereby when said control winding effects a resetting of the flux level in said one of the magnetic core members a voltage is produced across each of the plurality of load windings, to thereby effect a resetting of the flux level in all of the magnetic core members, unilateral conducting means connected in series circuit relationship with the parallel circuit including the plurality of load windings, and circuit means for connecting said series circuit in circuit relationship with said load and with said source of alternating current.

2. In an amplifier connected to receive energy from a source of alternating current and supply energy to a load, the combination comprising, two load windings, the load windings being connected in parallel circuit relationship with one another with respect to the source of alternating current, a magnetic core member disposed in inductive relationship with each of the two load windings, a control winding disposed in inductive relationship with one of the magnetic core members, whereby when said control winding effects a resetting of the flux level in said one of the magnetic core members a voltage is produced across each of the two load windings, to thereby effect a corresponding resetting of the flux level in the other of the magnetic core members, unilateral conducting means connected in series circuit relationship with the parallel circuit including the two load windings, and circuit means for connecting said series circuit in circuit relationship with said load and with said source of alternating current.

3. In an amplifier connected to receive energy from a source of alternating current and supply energy to a load, the combination comprising, two load windings, the load windings being connected in parallel circuit relationship with one another with respect to the source of alternating current, a magnetic core member disposed in inductive relationship with each of the two load windings, a control winding disposed in inductive relationship with one of the magnetic core members, whereby when said control winding effects a resetting of the flux level in said one of the magnetic core members a voltage is produced across each of the two load windings, to thereby effect a corresponding resetting of the flux level in the other of the magnetic core members, a self-saturating rectifier connected in series circuit relationship with the parallel circuit including the two load windings, and circuit means for connecting said series circuit in circuit relationship with said load and with said source of alternating current.

4. In an amplifier connected to receive energy from a source of alternating current and supply energy to a load, the combination comprising, a plurality of load windings, the load windings being connected in parallel circuit relationship with one another with respect to the source of alternating current, a magnetic core member disposed in inductive relationship with each of the load windings, unilateral conducting means connected in series circuit relationship with said parallel circuit including the plurality of load windings, another plurality of load windings, said another plurality of load windings being connected in parallel circuit relationship with one another with respect to the source of alternating current, a magnetic core member disposed in inductive relationship with each of the said another plurality of load windings, another unilateral conducting means connected in series circuit relationship with the parallel circuit including the said another plurality of load windings, circuit means for connecting said series circuits in circuit relationship with said load and with said source of alternating current, whereby current alternately flows through the said series circuits, a control winding disposed in inductive relationship with one of the magnetic core members of the said parallel circuit including the plurality of load windings, another control winding disposed in inductive relationship with one of the magnetic core members of the parallel circuit including the said another plurality of load windings, and other circuit means for applying a control voltage to said control windings, to thereby alternately effect a voltage across first the load windings of the said parallel circuit including the plurality of load windings, and second a voltage across the said another plurality of load windings.

5. In an amplifier connected to receive energy from a source of alternating current and supply energy to a load, the combination comprising, two sets of load windings, each set of load windings comprising two load windings and the load windings of each set being connected in parallel circuit relationship with one another with respect to the source of alternating current, a magnetic core member disposed in inductive relationship with each of the load windings of said two sets, a unilateral conducting means connected in series circuit relationship with each of the said two sets, circuit means for connecting said series circuits in circuit relationship with said load and with said source of alternating current, whereby current alternately flows through the said series circuits, a control winding disposed in inductive relationship with one of the magnetic core members of each of the said two sets, and other circuit means for applying a control voltage to said control windings, to thereby alternately effect a voltage across, first, one of the said two sets of load windings, and second, across the other of the said two sets of load windings.

6. In an amplifier connected to receive energy from a source of alternating current and supply energy to a load, the combination comprising, two sets of load windings, each set of load windings comprising two load windings and the load windings of each set being connected in parallel circuit relationship with one another with respect to the source of alternating current, a magnetic core member disposed in inductive relationship with each of the load windings of said two sets, a self-saturating rectifier connected in series circuit relationship with each of the said two sets, circuit means for connecting said series circuits in circuit relationship with said load and with said source of alternating current, whereby current alternately flows through the said series circuits, a control winding disposed in inductive relationship with one of the magnetic core members of each of the said two sets, and other circuit means for applying a control voltage to said control windings, to thereby alternately effect a voltage across, first, one of the said two sets of load windings, and second, across the other of the said two sets of load windings.

References Cited in the file of this patent

UNITED STATES PATENTS

| | | |
|---|---|---|
| 1,855,639 | Lee | Apr. 26, 1932 |
| 2,027,311 | Fitz Gerald | Jan. 7, 1936 |
| 2,516,563 | Graves | July 25, 1950 |